UNITED STATES PATENT OFFICE 2,237,104

COMPOSITE PIGMENT AND MANUFACTURE THEREOF

Norman F. Livingston, Chicago, Ill., assignor to The Sherwin-Williams Company, Cleveland, Ohio, a corporation of Ohio No Drawing. Application March 17, 1938, Serial No. 196,367

16 Claims. (Cl. 134—67)

The present invention relates generally to inorganic pigments, and particularly to forming such pigments with an associated substance, which improves the pigments in many directions.

The object of the present invention is to improve precipitated pigments to give pigments a superior quality for use in coating compositions such as paints, enamels, lacquers, printing inks, and water-dispersed compositions.

A particular object of the invention is to improve the manufacture of lead chromate pigments so that the ultimate product is intimately associated with an insoluble precipitated form of a metal silicate.

Lead chromate forms a basis or body of numerous pigments, such for example as chrome yellow, chrome green, chrome orange, and others. Various properties, colors and shades are obtained in known ways by the presence of other colored or uncolored substances as will appear in the examples hereinafter given. A wide variation of pigment compositions is contemplated.

It is well known that many precipitates in aqueous medium have a very light or fluffy form, in some cases called "flocculent," and that upon drying such precipitates they agglomerate into more dense forms or into larger aggregates. It is also known that the formation of precipitates, whether flocculent or highly granular is attended with a phenomenon called "occlusion," referring to the inclusion by the precipitate of dissolved or suspended matter from the aqueous medium in which the precipitate is formed. Usually this is a result to be avoided. However, in the present invention, the phenomenon is usefully applied to take advantage of the light undried form of a precipitate, and to take advantage of this tendency for occlusion.

Therefore, according to the present invention a precipitate is formed in the presence of another, either by successive precipitations or by simultaneous precipitation of at least two materials in the same medium. According to one practice a precipitate is formed, and suspended in undried condition in an aqueous medium. A second precipitate is then formed in the presence of the first precipitate to cause occlusion or other similar close union of the two precipitates, before either one is agglomerated or condensed by a drying, dehydrating or other procedure tending to render the solid body more dense or of larger particle size. Either the precipitated salt for the pigment is formed in an aqueous medium in the presence of the desired silicate, or the desired silicate is precipitated in aqueous medium in the presence of the precipitated salt for the pigment. By another procedure, the reagents are so chosen that both the silicate and the salt for the pigment are precipitated substantially together. Then the resulting composite substance for the pigment is processed in any ordinary manner to a paste or dry form, for use in wet pulping processes or for dry-milling operations.

The amount of metal silicate may vary from 1% to 20% of the ultimate pigment. Below 1% the improvements desired are not apparent or measurable at least in the ordinary tests and in ordinary processes, although they may exist in lower degree. Beginning with 1% of metal silicate the improvements begin to show up clearly, in ordinary tests or processing operations in which such pigments are commonly used. At 5% improvements are very pronounced in testing by ordinary methods paint and like compositions made from the improved pigments. Beginning at about 5% silicate the particular improvement in tinting strength begins to diminish as the silicate increases, owing to dilution of the pigment, but other properties become more pronounced. Above 20% of metal silicate the pigments become too diluted and the silicate begins to mask the pigment itself. Such compositions having over 20% of silicate may serve as special pigments for special purposes, and are therefore not excluded from the scope of the invention.

The metal silicate may be formed from any reagent having a metal cation forming an insoluble metal silicate with any reagent having a silicate anion reactive therewith. These need not be soluble reagents although such are preferred, particularly soluble metal salts and soluble silicate salts, such as the alkali silicates. However, it is to be noted that insoluble reagents can also react. For example colloidal silicic acid may be employed to provide the silicate radical, and difficultly soluble metal carbonates or hydroxides may be employed to provide the metal for the metal silicate. A solution of hydrated lime or soluble calcium salt and silicic acid sol or hydrated gel are suitable to form a calcium silicate for use in the invention. It is also to be appreciated that the metal silicate formed for this invention need not be in the simple stoichiometric relation of the metal cation and the silicate radical. Silicates in general are of complex character, and may be acidic with excess of silica involved in the compound, or be basic with excess of metal oxide involved in the compound. In fact there is some authority denying that these so-called silicates are chemical compounds, but only closely associated oxides in variable proportion with or without water in variable proportion. However, for the purposes of this invention they are termed silicates according to the presently accepted nomenclature. In general the precipitated insoluble metal silicate may be formed by reaction between (1) any soluble alkali metal silicate, of which many varieties are known, or any reactive form containing silicic acid, such as colloidal silica gel, and (2) any soluble salt of a metal such as calcium, barium, strontium, tin, aluminum, titanium, zirconium, lead, copper, iron and zinc, or even reactive difficultly soluble compounds of them. Where soluble reagents are used more voluminous precipitates result, and hence these are preferred. In the case where the insoluble silicate is formed in the presence of the pigment, the silicate no doubt occludes, coats, and impregnates the pigment particles which retain an incompletely condensed form to receive the silicate. In another case, where the pigments are formed in the presence of the incompletely condensed silicate precipitate, the same general character of intertwining of silicate and pigment appears to result, at least as evidenced by the general similarity in the properties of the product by both procedures. However, it has been observed that the composite pigment is more dense, cleaner and more brilliant when the silicate is last precipitated. When the chromate is last precipitated the product is lighter and not so clean and bright. These differences are more pronounced in lower ranges of silicate content. This is obviously due to more of the last precipitate being on the outside of the composite product. And when a non-pigment silicate is more to the outside, it protects the true pigment without materially hiding it. A greater surface concentration of silicate accounts for increased resistance to light and chemical action, and to differences in wettable character by oils, water, etc. Therefore, the invention in its preferred form contemplates precipitating the silicate last.

In order to explain how the intended variations of the invention may be carried out in a practical way, the following examples are given.

EXAMPLE 1.—*Chrome yellow*

A basic lead acetate, or lead nitrate solution is prepared containing 125 parts by weight of lead calculated as PbO. To this is added, slowly with stirring a solution containing 83.5 parts by weight of sodium bichromate $Na_2Cr_2O_7.2H_2O$. This results in precipitating lead chromate, known as chrome yellow.

Known practice calls for cleansing this pigment of soluble ingredients and processing to some standard pigment form. However, before carrying out such operations, particularly a drying operation, the silicate is introduced. This may be accomplished in this particular case by adding separate solutions, one containing 21 parts by weight of aluminum sulfate

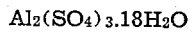

and the other containing a sodium silicate having the equivalent of 6 parts by weight of silica calculated as $SiO_2$, in any order of addition. In a particular form a quantity of 24 parts by weight of sodium silicate has been thus employed. This forms a precipitated aluminum silicate. The resulting composite pigment is washed, filtered, dried and ground in a usual manner. The pigment has a better color, greater tinting strength, is brighter, and more permanent than like pigment not having the silicate.

In the foregoing example the soluble lead salt and the soluble dichromate salt are used substantially in reacting proportions to form 181 parts of lead chromate $PbCrO_4$. The aluminum salt and the sodium silicate are used in substantially reacting proportions to form 9.4 parts of aluminum silicate $Al_2(SiO_3)_3$, but it is of course not known whether this particular form results or whether such formula applies. The resulting composite pigment has therefore approximately 5% insoluble silicate.

EXAMPLE 2.—*Chrome orange*

A basic lead acetate solution is prepared so as to contain 60 parts by weight of PbO and 9 parts by weight of acetic acid $CH_3COOH$. To this is added slowly with stirring a solution of 20 parts by weight of sodium bichromate $Na_2Cr_2O_7.2H_2O$, and then 2.6 parts by weight of caustic soda NaOH. The resulting pigment is chrome orange.

To this is added a sodium silicate solution providing 3.25 parts by weight of $SiO_2$. To precipitate a silicate, there is next added a solution containing one of the following: 7.8 parts by weight of calcium chloride $CaCl_2$, or 12 parts by weight of aluminum sulphate $Al_2(SO_4)_3.18H_2O$, or 13.4 parts by weight of magnesium sulphate $MgSO_4.7H_2O$. The resulting composite pigment is finished in the usual way.

In this example there may be formed about 73 parts $PbCrO_4.PbO$. Assuming that all the silica of the silicate enters into the insoluble silicate the composite pigment will have at least 4.25% silica, and of course considerably more of the metal silicate.

EXAMPLE 3.—*Chrome green*

A light shade of chrome yellow is formed from sodium bichromate and lead nitrate or lead acetate optionally in the presence of sulphate radical from the use of sulphuric acid or a soluble sulphate. An amount of iron blue (ferric ferrocyanide is added to give the desired shade of chrome green. The iron blue should be highly dispersed, and may be added either to the yellow pigment or to the lead solution to which the chromate-sulphate solution is added.

For every 100 parts of chrome green thus formed, there is added sodium silicate solution to provide 6.5 parts of $SiO_2$ and any one of the following: 35 parts anhydrous lead acetate, or 23.6 parts aluminum sulphate $Al_2(SO_4)_3.18H_2O$, or 27 parts magnesium sulphate $MgSO_4.7H_2O$. The composite pigment is finished in the usual manner. It will contain considerably over 6.5% of metal silicate.

EXAMPLE 4.—*Chrome yellow formed in presence of metal silicate*

41.2 parts of sodium silicate syrup containing 25% $SiO_2$ is dissolved in 2000 parts of water and to this is added one of the following: 18.7 parts anhydrous lead nitrate, or 38 parts aluminum sulphate $Al_2(SO_4)_3.18H_2O$, or 39.4 parts magnesium sulphate $MgSO_4.7H_2O$. The resulting insoluble silicate is washed until free from soluble salts. Then 125.5 parts of lead acetate solution (62° Baumé) is added, followed by 38.8 parts of sodium bichromate. The resulting pigment is washed, dried and ground. It is clean, bright, and of light gravity.

EXAMPLE 5.—*Molybdate orange pigment*

Dissolve 34 parts of anhydrous lead nitrate in 2000 parts of water. Add slowly with stirring a solution containing: 10.3 parts sodium bichromate crystals, 2 parts ammonium molybdate $(NH_4)_6Mo_7O_{24}.4H_2O$, and 2 parts sulphuric acid. To the resulting pigment suspension comprising lead chromate, lead molybdate and lead sulphate, add 5 parts of sodium silicate (25% $SiO_2$) and then 5.5 parts aluminum sulphate $Al_2(SO_4)_3.18H_2O$. Neutralize the excess acid with alkali such as caustic soda or sodium carbonate, and then filter, wash and dry the pigment. The resulting pigment is more resistant to light, has higher oil absorption and better working properties than a comparable pigment containing no precipitated silicate. A soluble tungstate, as of ammonium, may be used or in place of the molybdate salt, to give a pigment containing lead tungstate.

EXAMPLE 6.—*Chrome yellow*

Into a basic lead acetate solution containing 63 parts of PbO and 18 parts of acetic acid, is stirred a solution consisting of 1000 parts of water, 32 parts of sodium bichromate crystals and 6 parts of sulphuric acid. To the resulting suspension of chrome yellow is added a solution containing 19 parts of sodium silicate (25% $SiO_2$) and another solution containing 19 parts of dissolved aluminum sulphate crystals ($18H_2O$). The resulting pigment is washed and dried. It has unusual cleanness of shade, better resistance to light and to discoloration by chemical action, and better working properties than pigments so made but without the precipitated silicate. The pigment has increased absorption for oil, and better wetting characteristics toward water. It is more easily ground. In compositions it gives a higher gloss.

EXAMPLE 7.—*Chrome yellow (co-precipitation)*

A solution of 531 parts of sodium chromate ($Na_2CrO_4.4H_2O$) is prepared, and to this solution is added 20 parts of a sodium silicate preparation containing 28% by weight of silicon dioxide. Another solution is prepared, containing 513 parts anhydrous lead nitrate $Pb(NO_3)_2$ and 37 parts aluminum nitrate crystals $Al(NO_3)_3.9H_2O$. The latter solution is slowly added to that containing the sodium chromate and aluminum nitrate, maintaining vigorous agitation throughout. Both precipitates form together. The resulting pigment, which contains aluminum silicate, is washed, dried, and ground. A composite pigment of this type has noticeably superior properties as compared with a similar pigment containing no insoluble metal silicate. It is possible to prepare a pigment very similar to the above by using, in place of the aluminum nitrate, 47 parts of magnesium chloride ($MgCl_2.6H_2O$) and in this case, using 48 parts of sodium silicate (28% $SiO_2$) instead of the 20 parts above called for. Comparable pigments may be prepared containing lead, strontium, calcium, or other metals, as the metal for the said silicate, by using their acetates, nitrates, chlorides or other soluble compounds in lieu of aluminum nitrate of magnesium chloride.

It is particularly to be observed that although this is termed co-precipitation, the first product precipitated comes down substantially in the absence of any precipitate, then at the end the last precipitated material of both reactions comes down in the presence of both precipitates. Thus at least a portion of one precipitation takes place in the presence of at least a portion of the product of the other precipitation. This holds true in the cases where either precipitate is formed after the completion of the other precipitation.

Coating compositions, especially paints, made from the improved pigments are the best means for testing the characteristics as pigments, apart from the improved qualities noted in working the pigments into such compositions. One way to do this is to make side-by-side draw-downs comparing similar paints made both from the new and the old pigment. These are in part covered and in part exposed to light. For example, tests so made on pigments containing 5% aluminum silicate show higher and brighter colors before exposure to light. When exposed to sunlight, concentrated ultraviolet light, or other actinic light, the prior art pigments darken. On exposure for 24 hours in a fadeometer, the prior art pigments darken much more than the silicated pigments, and in many cases the exposed silicated pigment is better than the unexposed unsilicated pigment.

The foregoing examples show that various agents may be added to alter the color characteristics of lead chromate base pigments, without in any way preventing the contribution of the precipitated insoluble metal silicate. They also illustrate that the acidity or alkalinity of the processes described is not material to the results.

Where bright and light shades of pigments are desired the invention naturally is carried out with metals which form uncolored silicates, but there are cases where one may form colored silicates as by using iron or copper metal salts. In view of the simplicity of the process it has not been considered necessary to illustrate all the possibilities, but only to show how it may be carried out for the more common types of lead chromate pigments which are commercially abundant.

*The product*

In general the pigment shows increasing improvement in tinting strength up to about 5% silicate, and then a decreasing improvement. Other properties increase generally in proportion to the silicate content. These include better absorption for oil, ease of wettability by water, and greater stability of suspensions in water or oil, greater resistance to discoloration by heat, light and chemical action, less density, greater specific surface of ultimate pigment body, greater ease of grinding, less cohesion between particles, and others.

Paints, printing inks, enamels, lacquers, and especially water suspensions, are much more thixotropic than compositions made from comparable pigments not having the silicate. By "thixotropic" is meant the quality of suspensions becoming thick on standing, and being capable of becoming thin by agitation, again to become thick or thin again, as for example mud, which can be puddled by constant tapping to become thin. This property is highly valuable in coating compositions to prevent settling of pigment on standing, as on a shelf. It is to be distinguished from that jellying of such compositions which is non-reversible.

In the specification and the claims the term "insoluble metal silicate" is considered as limited to those water insoluble compounds, the formulas of which are reducible to only metal oxides and silica.

It is to be understood that the invention is not limited to or by the foregoing examples short of its scope as set forth in the appended claims.

I claim:

1. A process for the manufacture of pigments having a lead chromate base which comprises forming lead chromate by precipitation in an aqueous medium, forming an insoluble metal silicate by precipitation in an aqueous medium, and in performing said steps carrying out one precipitation in the presence of the originally-wet product of the other precipitation.

2. A process for the manufacture of pigments having a lead chromate base which comprises forming lead chromate by precipitation in an aqueous medium, and forming an insoluble metal silicate by precipitation in an aqueous medium in the presence of the originally-wet lead chromate.

3. A process for the manufacture of pigments having a lead chromate base which comprises forming an insoluble metal silicate by precipitation in an aqueous medium, and forming lead chromate by precipitation in an aqueous medium in the presence of the originally-wet metal silicate.

4. A process for the manufacture of pigments having a lead chromate base which comprises forming an insoluble metal silicate by precipitation in an aqueous medium by reaction between a soluble metal salt and a soluble metal silicate, separating the insoluble metal silicate from residual solid matter without drying the precipitate, suspending the precipitate in an aqueous medium, and forming lead chromate by precipitation in said aqueous medium in the presence of said suspended insoluble metal silicate.

5. A process for the manufacture of pigments having a lead chromate base which comprises forming lead chromate by precipitation in an aqueous medium by reaction between a soluble lead salt and a soluble chromate salt, and precipitating an insoluble metal silicate in said aqueous medium containing the lead chromate in suspension by reaction between a soluble metal salt and a soluble metal silicate.

6. In a process of making a pigment having a lead chromate base wherein lead chromate is formed by precipitation in an aqueous medium with variations to provide different chrome pigments in suspension, in which process the chrome pigment is later filtered, washed and dried, the step of precipitating an insoluble metal silicate in an aqueous medium in which said chrome pigment is suspended, said precipitation being performed before the chrome pigment is dried.

7. A composite pigment comprising essentially a precipitated lead chromate formed in water and a precipitated insoluble metal silicate formed in water, the two being intimately united with one occluding the other in that manner originating by precipitating the one in an aqueous medium in which is suspended the other in originally-wet precipitate form.

8. A composite pigment comprising essentially a precipitated lead chromate formed in water and a precipitated insoluble metal silicate formed in water, the two being intimately united with the metal silicate occluding the lead chromate in that manner originating by precipitating the said silicate in an aqueous medium in which is suspended the lead chromate in originally-wet precipitate form.

9. A composite pigment comprising essentially a precipitated lead chromate formed in water and a precipitated insoluble metal silicate formed in water, the two being intimately united with the lead chromate occluding the said silicate in that manner originating by precipitating the said lead chromate in an aqueous medium in which is suspended the said silicate in originally-wet precipitate form.

10. A composite pigment according to claim 7 in which the metal silicate varies from 1% to 20% of the weight of the essential constituents: lead chromate and metal silicate.

11. A process for the manufacture of pigments which comprises forming a pigment by precipitation in an aqueous medium, forming an insoluble metal silicate by precipitation in an aqueous medium, and in performing said steps carrying out one precipitation in the presence of the originally-wet product of the other precipitation.

12. A process for the manufacture of pigments which comprises forming a pigment by precipitation in an aqueous medium, forming an insoluble metal silicate by precipitation in an aqueous medium, and in performing said steps carrying out at least a portion of either precipitation in the presence of at least a portion of the originally-wet product of the other precipitation, whereby a precipitate formed in the presence of previously precipitated material becomes intimately associated therewith.

13. A process for the manufacture of pigments which comprises forming a pigment by precipitation in an aqueous medium, forming an insoluble metal silicate by precipitation in the same aqueous medium, and in performing said steps carrying out at least a portion of each precipitation simultaneously.

14. A process for the manufacture of pigments which comprises forming a pigment by precipitation and an insoluble metal silicate by precipitation in the same aqueous medium at substantially the same time whereby to form a co-precipitated composite product consisting of pigment and silicate intimately associated.

15. A composite pigment comprising a precipitated insoluble metal silicate formed in water and a precipitated inorganic pigment formed in water, the two being intimately united with one occluding the other in that manner originating by precipitating the one in an aqueous medium in which is suspended the other in originally-wet precipitate form.

16. A composite pigment comprising a precipitated insoluble metal silicate formed in water and a precipitated inorganic pigment formed in water, said two materials being physically combined, said combination being the product of precipitating at least a part of one of them in the presence of at least part of the other in the latter's originally-wet precipitate form.

NORMAN F. LIVINGSTON.